(12) United States Patent
Fukuoka

(10) Patent No.: US 11,201,973 B2
(45) Date of Patent: Dec. 14, 2021

(54) PRINTING SYSTEM FOR PRINTING ALIGNMENT MARK AND METHOD OF CONTROLLING PRINTING SYSTEM FOR PRINTING ALIGNMENT MARK

(71) Applicant: MIMAKI ENGINEERING CO., LTD., Nagano (JP)

(72) Inventor: Yoriko Fukuoka, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 17/120,230

(22) Filed: Dec. 13, 2020

(65) Prior Publication Data

US 2021/0099581 A1    Apr. 1, 2021

Related U.S. Application Data

(62) Division of application No. 16/252,579, filed on Jan. 19, 2019, now Pat. No. 10,911,614.

(30) Foreign Application Priority Data

Feb. 15, 2018    (JP) .............................. JP2018-025448

(51) Int. Cl.
*H04N 1/00* (2006.01)
*B41J 11/66* (2006.01)
*B41J 11/70* (2006.01)

(52) U.S. Cl.
CPC .......... *H04N 1/0032* (2013.01); *B41J 11/663* (2013.01); *B41J 11/703* (2013.01); *H04N 1/0066* (2013.01); *H04N 1/00676* (2013.01)

(58) Field of Classification Search
CPC ............... H04N 1/0032; H04N 1/0066; H04N 1/00676; H04N 1/00567; B41J 11/663; B41J 11/703; B41J 11/66; G06K 15/404
See application file for complete search history.

(56) References Cited

U.S. PATENT DOCUMENTS

2017/0011286 A1* 1/2017 Kouguchi .......... G06K 15/1868
2018/0065401 A1* 3/2018 Belling ................. G06F 3/1256
(Continued)

FOREIGN PATENT DOCUMENTS

| EP | 3437891 | ‡ | 2/2019 |
| JP | 2015020399 | ‡ | 2/2015 |
| WO | WO-2017169249 | ‡ | 10/2017 |

OTHER PUBLICATIONS

"Search Report of Europe Counterpart Application", dated Aug. 22, 2019, p.1-p.11.‡

*Primary Examiner* — Iriana Cruz

(74) *Attorney, Agent, or Firm* — JCIPRNET

(57) ABSTRACT

To provide a printing system that can print, on a medium, an alignment mark for aligning the medium in a processing device that performs processing on the medium after printing without complicated work carried out by a user. The printing system includes a printer, the processing device, a printer control unit, a processing device control unit, a data creating unit that creates printing data for performing printing on the medium and processing data for performing processing on the medium after printing, and a data processor that transmits the printing data to the printer control unit and transmits the processing data to the processing device control unit. The data processor creates alignment data for aligning the medium in the processing device, and transmits the alignment data to the printer control unit. The printer control unit controls the printer to print the alignment mark on the medium.

6 Claims, 4 Drawing Sheets

(56) References Cited

U.S. PATENT DOCUMENTS

2018/0162149 A1\* 6/2018 Vulpe .................... B41J 11/663
2019/0061402 A1‡ 2/2019 Horiuchi ................. G09F 13/12

\* cited by examiner
‡ imported from a related application

PRINTING SYSTEM FOR PRINTING ALIGNMENT MARK AND METHOD OF CONTROLLING PRINTING SYSTEM FOR PRINTING ALIGNMENT MARK

CROSS REFERENCE TO RELATED APPLICATIONS

This application is a divisional application of and claims the priority benefit of a prior U.S. application Ser. No. 16/252,579 filed on Jan. 19, 2019, now allowed, which claims the priority of Japan patent application serial no. 2018-025448, filed on Feb. 15, 2018. The entirety of the above-mentioned patent application is hereby incorporated by reference herein and made a part of this specification.

BACKGROUND OF THE INVENTION

Technical Field

The present disclosure relates to a printing system including a printer that performs printing on a medium, and a method of controlling the printing system.

Background Art

In the related art, there is a printer having a cutting function (for example, refer to Patent Literature 1). The printer disclosed in Patent Literature 1 includes an ink head that performs printing on a recording paper, and a cutting head that cuts the recording paper. The printer can perform printing and cutting processing for cutting the recording paper after performing printing on the recording paper, and cutting and printing processing for performing printing on the recording paper after cutting the recording paper.

To perform printing and cutting processing with the printer disclosed in Patent Literature 1, first, a predetermined image is printed on recording paper based on image data, and crop marks are printed in a vicinity of four corners of the image. Thereafter, the crop marks are detected by a sensor, and reference positions for cutting are acquired from the crop marks to cut the recording paper based on cutting data. On the other hand, to perform cutting and printing processing with the printer disclosed in Patent Literature 1, first, the recording paper is cut in a predetermined shape based on the cutting data, and square-shaped cutting is performed, as crop marks, in the vicinity of the four corners of a portion that is cut in the predetermined shape. Thereafter, cutting as the crop marks is detected by the sensor, and reference positions for printing are acquired from the crop marks to print the image on the recording paper based on the image data.

Patent Literature 1: Japanese Unexamined Patent Publication No. 2015-20399

SUMMARY

The inventor of the present disclosure considers using a printer for printing a medium and a cutting device for cutting a medium as different devices to cut, in a predetermined shape, the medium on which printing is performed by the printer by the cutting device, or performing printing, by the printer, on the medium after being cut by the cutting device. The inventor of the present disclosure also considers, for example, using a personal computer (PC) in which a software for creating an image, a software for controlling the printer, and a software for controlling the cutting device are installed to cause a user to create printing data for performing printing on the medium and cutting data for cutting the medium, transmitting the created printing data to the printer, and transmitting the created cutting data to the cutting device.

In a case in which the printer and the cutting device are different devices, to cut the medium after printing in a predetermined shape, the medium after printing needs to be carried from the printer to the cutting device to be set to the cutting device. In setting the medium after printing to the cutting device, a reference position of the medium needs to be matched with a reference position of the cutting device so that a printing position and a cutting position are not deviated from correct positions. Thus, the inventor of the present disclosure considers printing, on the medium, an alignment mark for aligning the medium in the cutting device.

To print the alignment mark on the medium, alignment printing data the alignment mark on the medium may be created by a user on a PC together with printing data and cutting data, and the created alignment data may be transmitted to the printer to print the alignment mark on the medium with the printer. However, in this case, the user needs to create the alignment data, and the user is required to carry out complicated work.

The first subject of the present disclosure is to provide a printing system in which the alignment mark can be printed on the medium without complicated work carried out by the user, the alignment mark for aligning the medium in a processing device that performs predetermined processing on the medium after printing. In addition, the first subject of the present disclosure is to provide a method of controlling the printing system in which the alignment mark can be printed on the medium without complicated work carried out by the user, the alignment mark for aligning the medium in a processing device that performs predetermined processing on the medium after printing.

In a case in which the printer and the cutting device are different devices, to perform printing on the medium after cutting, the medium after cutting needs to be carried from the cutting device to the printer to be set to the printer. To set the medium after cutting to the printer, the reference position of the medium after cutting needs to be matched with the reference position of the printer so that printing is performed at an appropriate position of the medium after cutting. Thus, the inventor of the present disclosure considers printing, on a different medium by the printer, the alignment mark for aligning the medium after cutting in the printer, setting the different medium on which the alignment mark is printed to the printer, and placing the medium after cutting on the different medium on which the alignment mark is printed.

In a case of printing the alignment mark on the different medium, the user may be caused to create, on a PC, the alignment printing data the alignment mark on the different medium together with the printing data and the cutting data, the created alignment data may be transmitted to the printer, and the alignment mark may be printed on the different medium by the printer. However, in this case, the user needs to create the alignment data, and the user is required to carry out complicated work.

The second subject of the present disclosure is to provide a printing system in which the alignment mark can be printed on a different medium without complicated work carried out by the user, the alignment mark for aligning the medium that has been processed by a predetermined processing device in the printer. In addition, the second subject of the present disclosure is to provide a method of controlling the printing system in which the alignment mark can be printed on a different medium without complicated work carried out by the user, the alignment mark for aligning the medium that has been processed by a predetermined processing device in the printer.

To solve the first subject described above, the printing system according to the present disclosure includes: a printer, configured to perform printing on a medium; a processing device, configured to perform predetermined processing on the medium on which the printer has performed printing; a printer control unit, configured to control the printer; a processing device control unit, configured to control the processing device; a data creating unit, configured to create printing data for performing printing on the medium by the printer and processing data for performing processing on the medium on which printing is performed by the processing device; and a data processor, configured to receive the printing data and the processing data created by the data creating unit, transmit the received printing data to the printer control unit, and transmit the received processing data to the processing device control unit, wherein the data processor creates alignment data for aligning the medium in the processing device based on the printing data and the processing data, and transmits the alignment data to the printer control unit, and the printer control unit controls the printer based on the alignment data received from the data processor to print an alignment mark on the medium.

To solve the first subject described above, in the method of controlling the printing system according to the present disclosure, the printing system includes: a printer, configured to perform printing on a medium; a processing device, configured to perform predetermined processing on the medium on which the printer has performed printing; a printer control unit, configured to control the printer; and a data creating unit, configured to create printing data for performing printing on the medium by the printer and processing data for performing processing on the medium on which printing is performed by the processing device, and the method includes: a data creating step for creating alignment data for aligning the medium in the processing device based on the printing data and the processing data created by the data creating unit; a data transmitting step for transmitting the alignment data and the printing data created at the data creating step to the printer control unit; and a printing step for controlling the printer based on the alignment data by the printer control unit to print an alignment mark on the medium.

In the printing system according to the present disclosure, the data processor creates the alignment data for aligning the medium in the processing device based on the printing data and the processing data, and transmits the alignment data to the printer control unit. In the method of controlling the printing system according to the present disclosure, the alignment data is created based on the printing data and the processing data at the data creating step, and the alignment data and the printing data are transmitted to the printer control unit at the data transmitting step. That is, according to the present disclosure, even when the user does not create the alignment data, the alignment data is automatically created based on the printing data and the processing data, and transmitted to the printer control unit.

In the printing system according to the present disclosure, the printer control unit controls the printer based on the alignment data received from the data processor to print the alignment mark on the medium. In the method of controlling the printing system according to the present disclosure, the printer control unit controls the printer based on the alignment data to print the alignment mark on the medium at the printing step. Thus, according to the present disclosure, the alignment mark for aligning the medium in the processing device can be printed on the medium without complicated work carried out by the user.

According to the present disclosure, for example, the processing device is a cutting device, configured to cut the medium after printing in a predetermined shape, the processing data is cutting data for cutting the medium after printing in a predetermined shape, the printer control unit controls the printer based on the printing data received from the data processor to perform printing on the medium, the medium after printing is manually set to the cutting device by using the alignment mark, and the processing device control unit controls the cutting device based on the cutting data received from the data processor to cut the medium. In this case, the alignment mark for aligning the medium after printing in the cutting device can be printed on the medium without complicated work carried out by the user.

According to the present disclosure, for example, the data processor creates the alignment data having a quadrangular frame shape in which the entire printing data and processing data are included, and the printer prints the alignment mark having a quadrangular frame shape on the medium. In this case, the alignment mark is created in a quadrangular frame shape, so that the medium can be easily aligned in the processing device.

According to the present disclosure, the data processor preferably designates a special color of the alignment data, and transmits the alignment data to the printer control unit together with the printing data. With this configuration, the printer control unit can distinguish between the printing data and the alignment data using the special color even when the printing data is transmitted to the printer control unit together with the alignment data, so that the printing data and the alignment data can be transmitted from the data processor to the printer control unit at the same time. Thus, time required for transferring the data from the data processor to the printer control unit can be shortened.

To solve the second subject described above, the printing system according to the present disclosure includes: a processing device, configured to perform predetermined processing on a medium; a printer, configured to perform printing on the medium that has been processed by the processing device; a processing device control unit, configured to control the processing device; a printer control unit, configured to control the printer; a data creating unit, configured to create processing data for performing processing on the medium by the processing device and printing data for performing printing on the medium after being processed by the printer; and a data processor, configured to receive the printing data and the processing data created by the data creating unit, transmit the received printing data and the processing data to the printer control unit, and transmit the received processing data to the processing device control unit, wherein the printer control unit controls the printer based on the processing data received from the data processor to print, on a second medium different from the medium, an alignment mark for aligning the medium processed by the processing device in the printer.

To solve the second subject described above, in the method of controlling the printing system according to the present disclosure, the printing system includes: a processing device, configured to perform predetermined processing on a medium; a printer, configured to perform printing on the medium that has been processed by the processing device; a printer control unit, configured to control the printer; and a data creating unit, configured to create processing data for performing processing on the medium by the processing device and printing data for performing printing on the medium after processing by the printer, and the method includes: a data transmitting step for transmitting the printing data and the processing data created by the data creating unit to the printer control unit; and a printing step for controlling the printer based on the processing data by the printer control unit to print, on a second medium different from the medium, an alignment mark for aligning the medium processed by the processing device in the printer.

In the printing system according to the present disclosure, the data processor transmits the processing data created by the data creating unit to the printer control unit, and the printer control unit controls the printer based on the processing data received from the data processor to print, on the second medium different from the medium, the alignment mark for aligning the medium processed by the processing device in the printer. In the method of controlling the printing system according to the present disclosure, the processing data created by the data creating unit is transmitted to the printer control unit at the data transmitting step, and the printer control unit controls the printer based on the processing data to print, on the second medium different from the medium, the alignment mark for aligning the medium processed by the processing device in the printer at the printing step.

That is, according to the present disclosure, even when the user does not create the alignment data for aligning the medium that has been processed by the processing device in the printer, the processing data is automatically transmitted from the data processor to the printer control unit, and the alignment mark for aligning the medium after processing in the printer is printed on the second medium by the printer based on the processing data. Thus, according to the present disclosure, the alignment mark for aligning the medium that has been processed by a predetermined processing device in the printer can be printed on a different medium without complicated work carried out by the user.

According to the present disclosure, for example, the processing device is a cutting device, configured to cut the medium in a predetermined shape, the processing data is cutting data for cutting the medium in a predetermined shape, and the printer control unit controls the printer based on the cutting data received from the data processor to print, on the second medium, the alignment mark for aligning the medium cut by the cutting device in the printer. In this case, the alignment mark for aligning the medium after cutting in the printer can be printed on a different medium without complicated work carried out by the user.

According to the present disclosure, for example, the medium after cutting is manually set, by using the alignment mark, on the second medium that is set to the printer, and the printer control unit controls the printer based on the printing data received from the data processor to perform printing on the medium after cutting.

According to the present disclosure, it is preferable that a special color of the processing data is designated by the data creating unit, and the data processor transmits the processing data to the printer control unit together with the printing data. With this configuration, the printer control unit can distinguish between the printing data and the processing data using the special color even when the printing data is transmitted to the printer control unit together with the processing data, so that the printing data and the processing data can be transmitted from the data processor to the printer control unit at the same time. Thus, time required for transferring the data from the data processor to the printer control unit can be shortened.

According to the present disclosure, for example, the medium is a flat-shaped resin plate made of resin, and the cutting device is a laser cutter, configured to cut the medium with a laser beam. In this case, when the medium after printing is cut with the laser cutter, ink at an end portion of the medium after cutting is melted, so that appearance of the medium after cutting is deteriorated when printing is performed up to the end portion of the medium after cutting. However, in the present disclosure, printing is performed on the medium after cutting, so that the appearance of the medium after cutting is good even when printing is performed up to the end portion of the medium after cutting.

As described above, according to the present disclosure, the alignment mark can be printed on the medium without complicated work carried out by the user, the alignment mark for aligning the medium in the processing device that performs predetermined processing on the medium after printing. In addition, according to the present disclosure, the alignment mark can be printed on a different medium without complicated work carried out by the user, the alignment mark for aligning the medium that has been processed by a predetermined processing device in the printer.

DESCRIPTION OF EMBODIMENTS

The following describes an embodiment of the present disclosure with reference to the drawings.

Configuration of Printing System and Control Method Thereof

Figure 1:
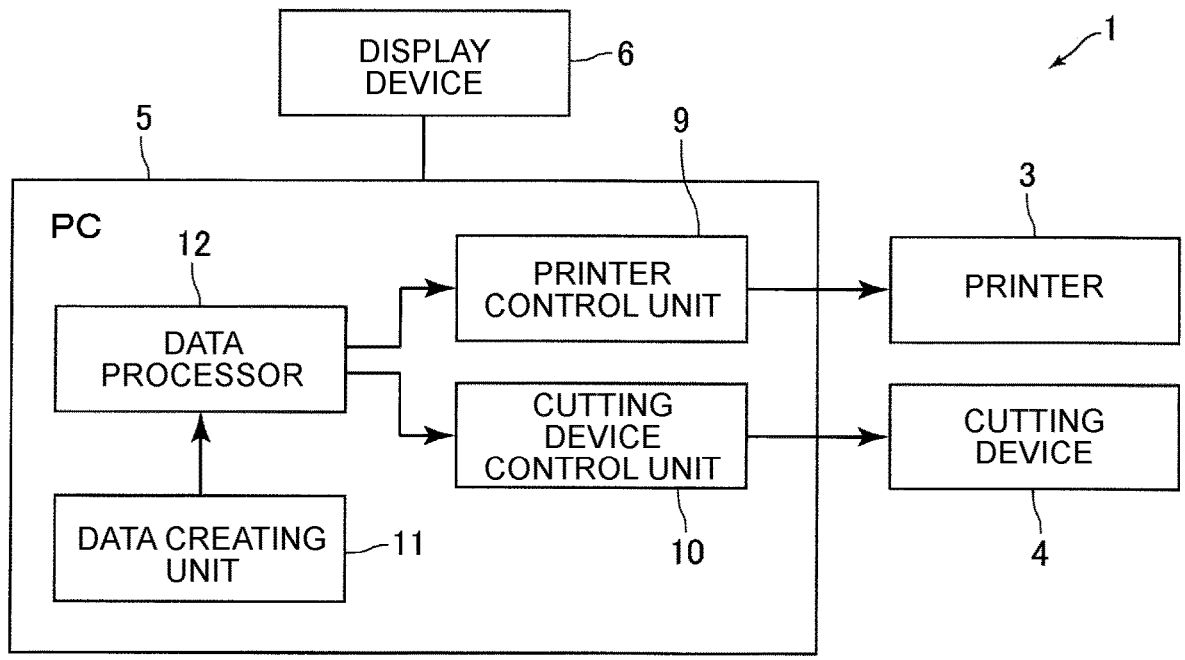
FIG. 1 is a block diagram for explaining a configuration of a printing system according to an embodiment of the present disclosure.
Figure 2:
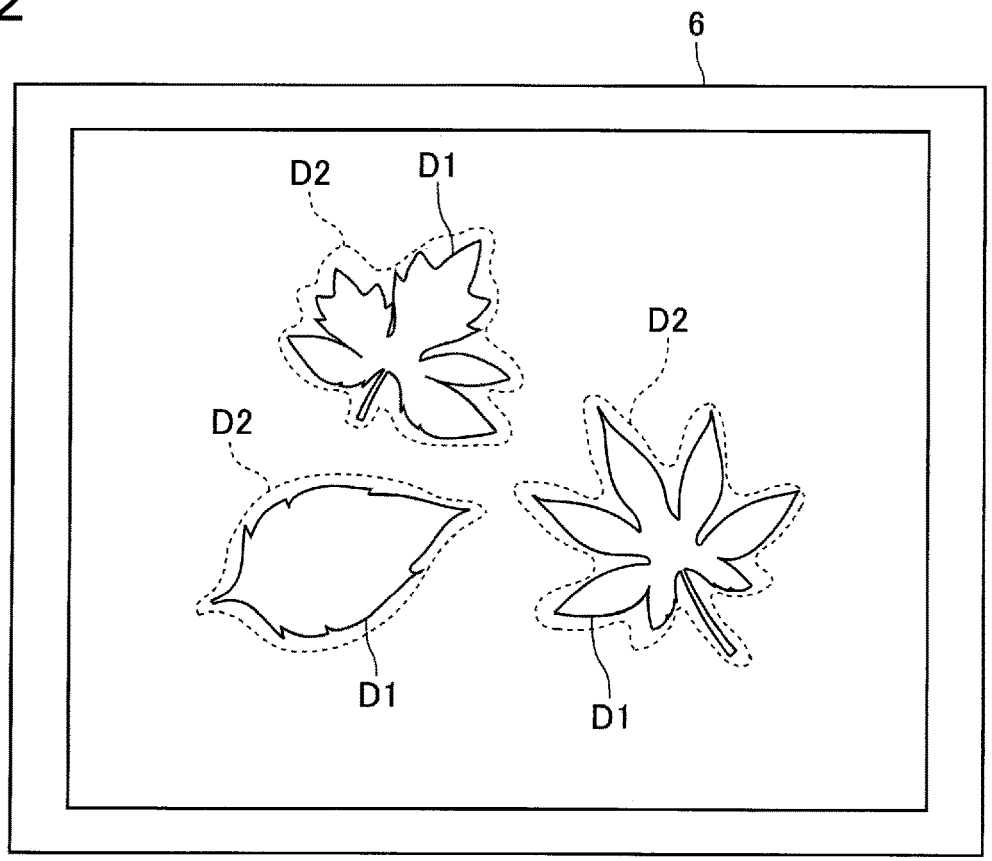
FIG. 2 is a diagram illustrating an example of a display of a display device illustrated in FIG. 1.
Figure 3:
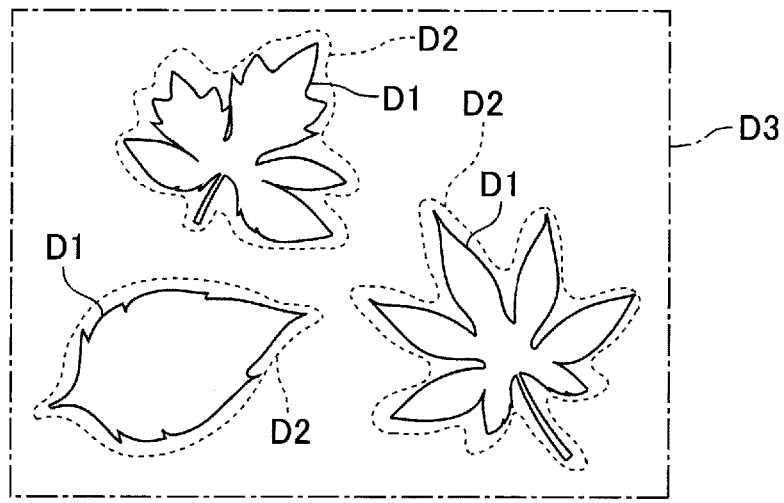
FIG. 3 is a diagram for explaining alignment data created by a data processor illustrated in FIG. 1.
Figure 4:
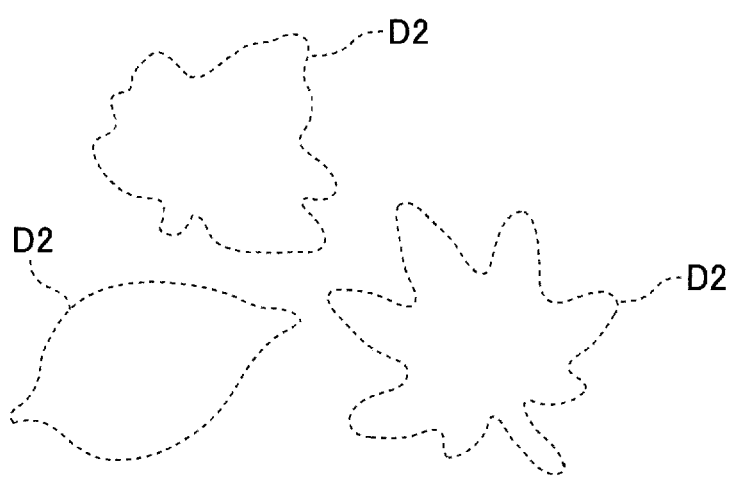
FIG. 4 is a diagram for explaining cutting data transmitted to a cutting device control unit from the data processor illustrated in FIG. 1.
Figure 5:
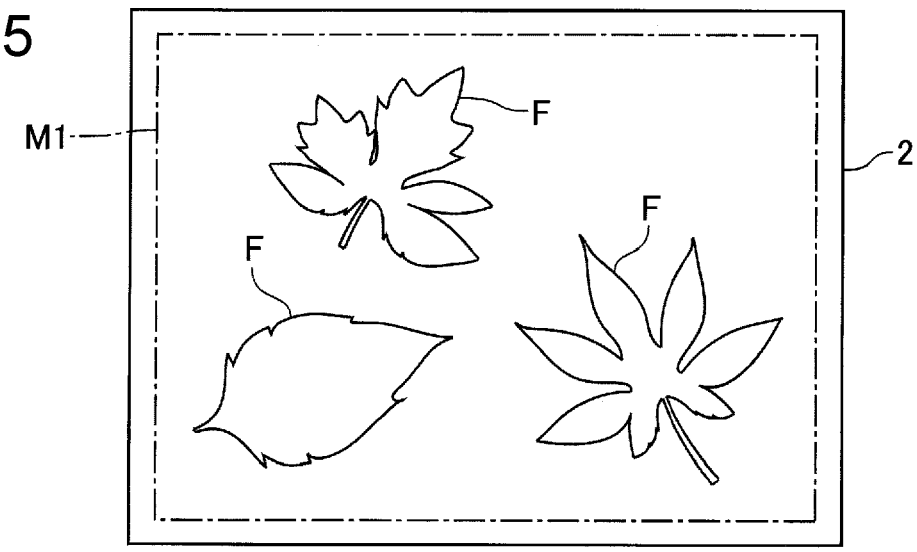
FIG. 5 is a diagram illustrating an example of an image that is printed on a medium by a printer illustrated in FIG. 1.
Figure 6:
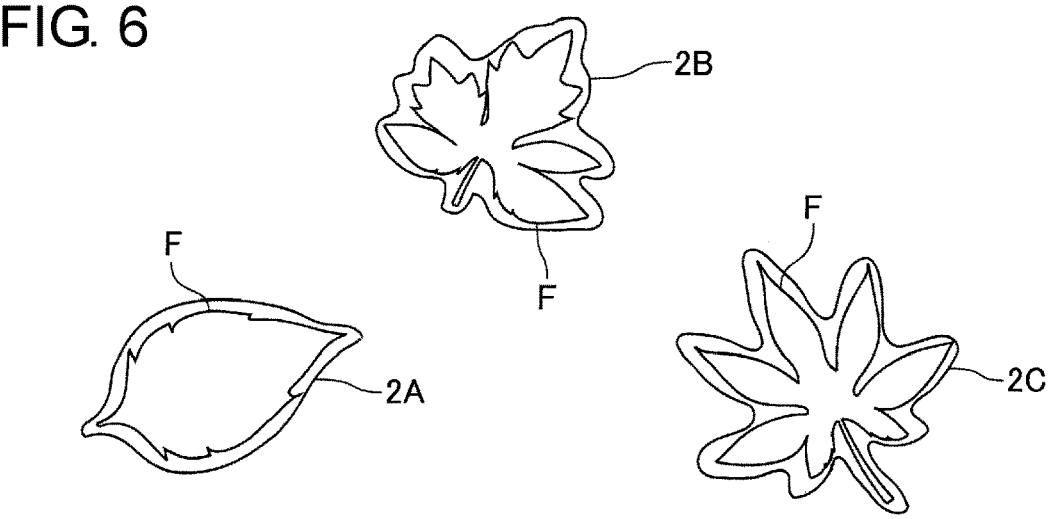
FIG. 6 is a diagram illustrating a medium after being cut by a cutting device illustrated in FIG. 1.

FIG. 1 is a block diagram for explaining a configuration of a printing system 1 according to the embodiment of the present disclosure. FIG. 2 is a diagram illustrating an example of a display of a display device 6 illustrated in FIG. 1. FIG. 3 is a diagram for explaining alignment data D3 created by a data processor 12 illustrated in FIG. 1. FIG. 4 is a diagram for explaining cutting data D2 transmitted to a cutting device control unit 10 from the data processor 12 illustrated in FIG. 1. FIG. 5 is a diagram illustrating an example of an image printed on a medium 2 by a printer 3 illustrated in FIG. 1. FIG. 6 is a diagram illustrating media 2A to 2C after being cut by a cutting device 4 illustrated in FIG. 1.

The printing system 1 according to the present embodiment includes the printer 3 that performs printing on the medium 2 (refer to FIG. 5), the cutting device 4 that cuts the medium 2 in a predetermined shape, and a personal computer (PC) 5 to which the printer 3 and the cutting device 4 are connected. The printing system 1 also includes the display device 6 such as a liquid crystal display device connected to the PC 5. The medium 2 is a flat-shaped resin plate made of resin. The medium 2 according to the present embodiment is a transparent resin plate such as an acrylic plate.

The printer 3 is an inkjet printer. The printer 3 includes a table on which the medium 2 is placed. The cutting device 4 is a laser cutter that cuts the medium 2 with a laser beam. The cutting device 4 includes a table on which the medium 2 is placed. In the present embodiment, the cutting device 4 cuts the medium 2 on which the printer 3 has performed printing. The cutting device 4 according to the present embodiment is a processing device that performs predetermined processing on the medium 2 on which the printer 3 has performed printing.

The PC 5 includes various types of a hardware including a storage module such as a hard disk drive, and a computing module and the like such as a CPU. In the PC 5, a software for creating an image (image creating software), a software for controlling the printer 3 (printer driver), and a software for controlling the cutting device 4 (software for a cutting device) are installed.

The PC 5 also includes a printer control unit 9 for controlling the printer 3, a cutting device control unit 10 for controlling the cutting device 4, a data creating unit 11 for creating printing data D1 for performing printing on the medium 2 by the printer 3 and the cutting data D2 for cutting the medium 2 after printing in a predetermined shape by the cutting device 4, and a data processor 12 that receives the printing data D1 and the cutting data D2 created by the data creating unit 11, transmits the received printing data D1 to the printer control unit 9, and transmits the received cutting data D2 to the cutting device control unit 10. The cutting device control unit 10 according to the present embodiment is a processing device control unit, and the cutting data D2 is processing data for performing processing on the medium 2 by the cutting device 4 as a processing device.

The printer control unit 9 is constituted of a printer driver and a hardware of the PC 5 that executes a program of the printer driver. The cutting device control unit 10 is constituted of a software for a cutting device and a hardware of the PC 5 that executes a program of the software. The data creating unit 11 and the data processor 12 are constituted of an image creating software and a hardware of the PC 5 that executes a program of the software.

A user of the printing system 1 creates the printing data D1 and the cutting data D2 by utilizing the image creating software. For example, the user creates three pieces of printing data D1 represented by a solid line in FIG. 2 and three pieces of cutting data D2 (that is, the cutting data D2 represented by a dashed line in FIG. 2) surrounding the respective three pieces of printing data D1 by utilizing the image creating software while checking an image displayed on the display device 6. Although the cutting data D2 is larger than the printing data D1 in the present embodiment, the cutting data D2 may be smaller than the printing data D1. That is, a part of the printing data D1 may protrude from the cutting data D2.

The user designates a process color or a special color of the printing data D1, and designates a special color of the cutting data D2 by utilizing the image creating software. The printing data D1 and the cutting data D2 are created by the data creating unit 11. The process color or the special color of the printing data D1 and the special color of the cutting data D2 are designated by the data creating unit 11. The special color of the cutting data D2 is different from the special color of the printing data D1.

The data creating unit 11 transmits the printing data D1 and the cutting data D2 to the data processor 12. The data processor 12 receives the printing data D1 and the cutting data D2 created by the data creating unit 11. The data processor 12 creates the alignment data D3 for aligning the medium 2 after printing in the cutting device 4 based on the printing data D1 and the cutting data D2 (data creating step). That is, the data processor 12 creates the alignment data D3 based on the printing data D1 and the cutting data D2 created by the data creating unit 11.

In the present embodiment, as represented by an alternate long and short dash line in FIG. 3, the data processor 12 creates the alignment data D3 having a quadrangular frame shape in which the entire printing data D1 and cutting data D2 are included. Specifically, the data processor 12 creates the alignment data D3 that is created in a rectangular frame shape. The data processor 12 designates a special color of the alignment data D3. The special color of the alignment data D3 is different from the special color of the cutting data D2 and the special color of the printing data D1.

The data processor 12 transmits the alignment data D3 to the printer control unit 9 (data transmitting step). Specifically, the data processor 12 transmits the alignment data D3 to the printer control unit 9 together with the printing data D1. More specifically, the data processor 12 transmits the cutting data D2 to the printer control unit 9 together with the alignment data D3 and the printing data D1. That is, the data processor 12 transmits, to the printer control unit 9, the printing data D1, the cutting data D2, and the alignment data D3 as one data file. The data processor 12 also transmits the cutting data D2 to the cutting device control unit 10 (refer to FIG. 4). The data processor 12 does not necessarily transmit the cutting data D2 to the printer control unit 9. That is, the data processor 12 may transmit the printing data D1 and the alignment data D3 to the printer control unit 9 as one data file.

The printer control unit 9 controls the printer 3 based on the printing data D1 received from the data processor 12 to print a predetermined image F on the medium 2 (refer to FIG. 5). When the user performs a predetermined operation, the printer control unit 9 controls the printer 3 based on the alignment data D3 (the alignment data D3 with the designated special color) received from the data processor 12 to print, on the medium 2, an alignment mark M1 for aligning the medium 2 after printing in the cutting device 4 (printing step). In the present embodiment, the printer 3 prints, on the medium 2, the alignment mark M1 created in a quadrangular frame shape (refer to FIG. 5). Printing of the image F and printing of the alignment mark M1 may be successively performed, or may be performed at the same time.

When printing by the printer 3 is ended, the user carries the medium 2 after printing from the printer 3 to the cutting device 4, and sets the medium 2 to the cutting device 4. At this point, the user sets the medium 2 after printing to the cutting device 4 by using the alignment mark M1. For example, a mark for aligning the medium 2 is created on the table of the cutting device 4, and the medium 2 after printing is set to the cutting device 4 so that the alignment mark M1 printed on the medium 2 as a transparent resin plate is overlapped with the mark on the table of the cutting device 4. That is, the medium 2 after printing is manually set to the cutting device 4 by using the alignment mark M1.

When the user performs a predetermined operation after the medium 2 after printing is set to the cutting device 4, the cutting device control unit 10 controls the cutting device 4 based on the cutting data D2 received from the data processor 12 to cut the medium 2. When cutting processing performed by the cutting device 4 is ended, as illustrated in FIG. 6, three media 2A to 2C are completed.

Main Effect of Present Embodiment

As described above, in the present embodiment, the data processor 12 creates the alignment data D3 based on the printing data D1 and the cutting data D2 created by the data creating unit 11, and transmits the alignment data D3 to the printer control unit 9. That is, in the present embodiment, even when the user does not create the alignment data D3, the data processor 12 automatically creates the alignment data D3 based on the printing data D1 and the cutting data D2, and transmits the alignment data D3 to the printer control unit 9. In the present embodiment, the printer control unit 9 controls the printer 3 based on the alignment data D3 received from the data processor 12 to print the alignment mark M1 on the medium 2. Thus, in the present embodiment, the alignment mark M1 for aligning the medium 2 after printing in the cutting device 4 can be printed on the medium 2 without complicated work carried out by the user.

In the present embodiment, the data processor 12 designates the special color of the alignment data D3. Thus, in the present embodiment, the printer control unit 9 can distinguish between the printing data D1 and the alignment data D3 using the special color even when the alignment data D3 is transmitted to the printer control unit 9 together with the printing data D1. Thus, in the present embodiment, the printing data D1 and the alignment data D3 can be transmitted from the data processor 12 to the printer control unit 9 at the same time, and as a result, time required for transferring the data from the data processor 12 to the printer control unit 9 can be shortened. In the present embodiment, the alignment mark M1 created in a quadrangular frame shape is printed on the medium 2 by the printer 3, so that the medium 2 can be easily aligned in the cutting device 4.

Modification of Method of Printing and Cutting Medium

Figure 7:
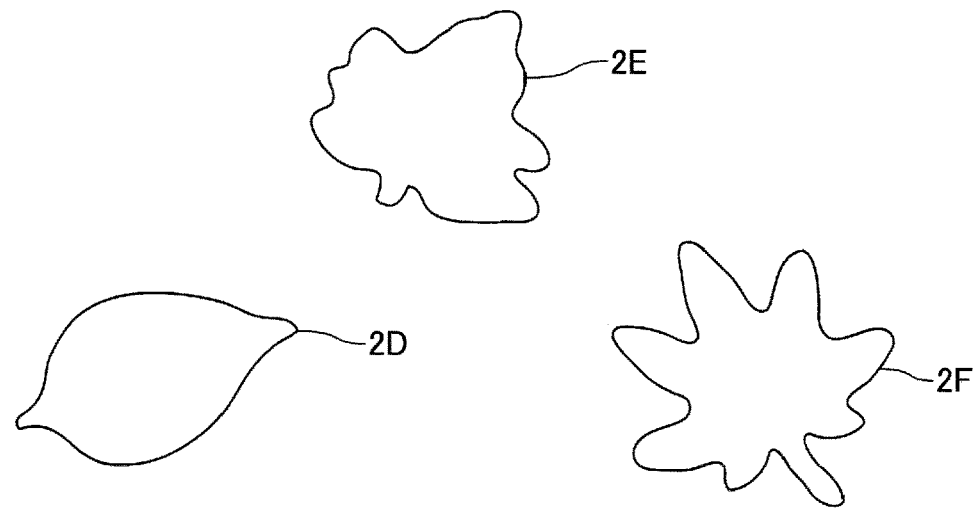
FIG. 7 is a diagram illustrating a medium after cutting according to another embodiment of the present disclosure.
Figure 8:
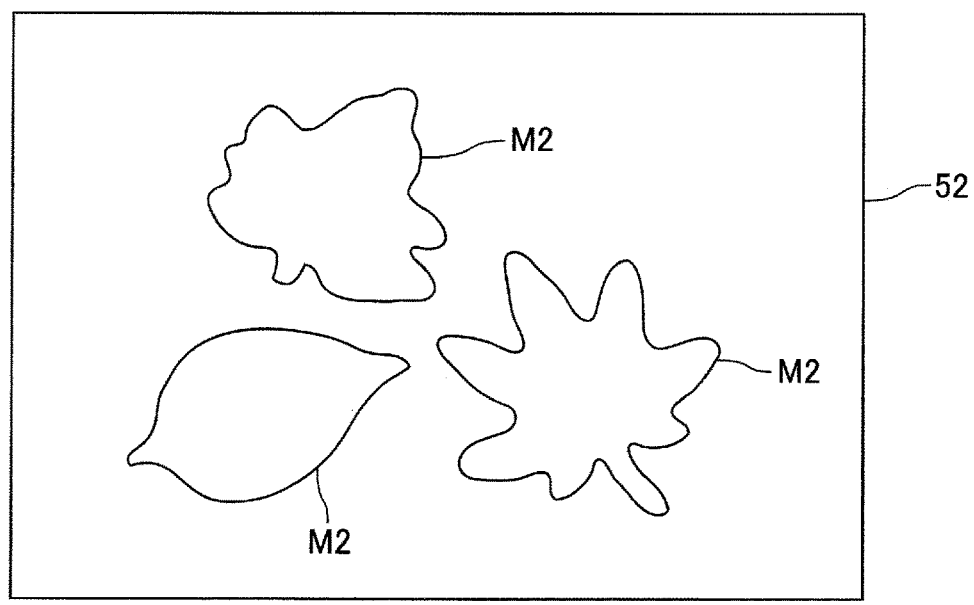
FIG. 8 is a diagram illustrating an alignment mark for aligning the medium illustrated in FIG. 7.
Figure 9:
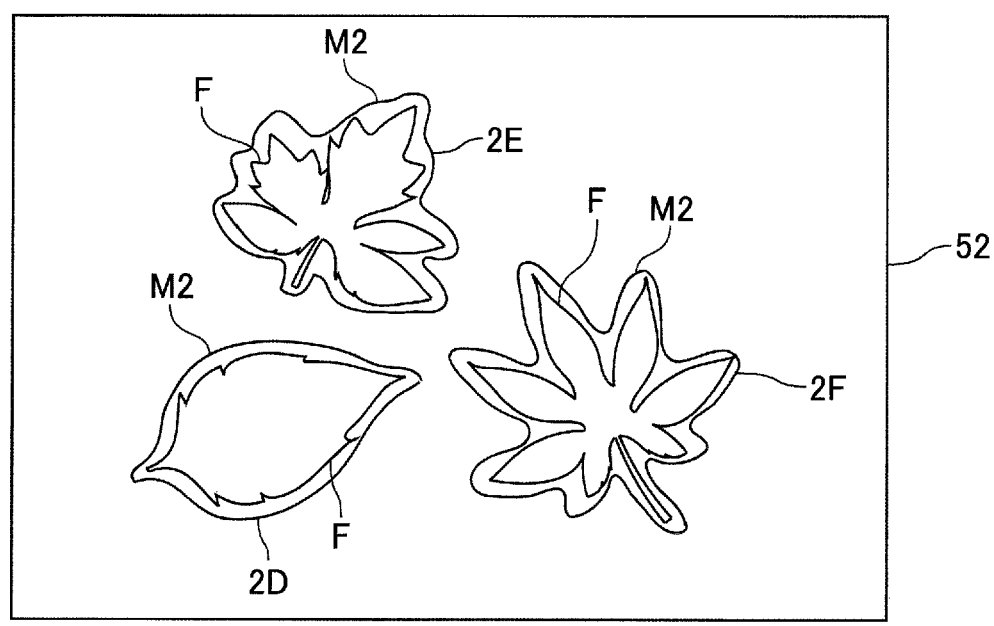
FIG. 9 is a diagram illustrating a state after printing is performed on the medium illustrated in FIG. 7.

FIG. 7 is a diagram illustrating media 2D to 2F after cutting according to another embodiment of the present disclosure. FIG. 8 is a diagram illustrating an alignment mark M2 for aligning the media 2D to 2F illustrated in FIG. 7. FIG. 9 is a diagram illustrating a state after printing is performed on the media 2D to 2F illustrated in FIG. 7.

In the above embodiment, printing may be performed on the media 2D to 2F after cutting by the printer 3 after the medium 2 is cut in a predetermined shape by the cutting device 4. Also in this case, similarly to the above embodiment, the user creates the cutting data D2 for cutting the medium 2 in a predetermined shape by the cutting device 4, and the printing data D1 for performing printing on the medium 2 after being cut by the printer 3 by utilizing the image creating software. The user designates the process color or the special color of the printing data D1, and designates the special color of the cutting data D2 by utilizing the image creating software.

In this modification, similarly to the above embodiment, the printing data D1 and the cutting data D2 are created by the data creating unit 11, and the process color or the special color of the printing data D1 and the special color of the cutting data D2 are designated by the data creating unit 11.

The data processor 12 receives the printing data D1 and the cutting data D2 created by the data creating unit 11. The data processor 12 transmits the cutting data D2 to the cutting device control unit 10. The cutting device control unit 10 controls the cutting device 4 based on the cutting data D2 received from the data processor 12 to cut the medium 2. For example, as illustrated in FIG. 7, the cutting device 4 cuts the medium 2 into three media 2D to 2F.

The data processor 12 transmits the printing data D1 and the cutting data D2 to the printer control unit 9 (data transmitting step). Specifically, the data processor 12 transmits the cutting data D2 to the printer control unit 9 together with the printing data D1. Thereafter, when the user performs a predetermined operation, the printer control unit 9 controls the printer 3 based on the cutting data D2 received from the data processor 12 to print, on a medium 52 different from the medium 2, the alignment mark M2 (refer to FIG. 8) for aligning the media 2D to 2F cut by the cutting device 4 in the printer 3 (printing step). The alignment mark M2 has the same shape as that of the media 2D to 2F. The medium 52 according to the modification is a second medium.

When printing of the alignment mark M2 on the medium 52 is ended, the user carries the media 2D to 2F after cutting from the cutting device 4 to the printer 3, and sets the media 2D to 2F to the medium 52 that is set on the table of the printer 3. At this point, the user sets the media 2D to 2F to the medium 52 so that the media 2D to 2F are overlapped with respective marks for alignment M2. That is, the media 2D to 2F after cutting are manually set, by using the marks for alignment M2, on the medium 52 that is set to the printer 3.

When the user performs a predetermined operation after the media 2D to 2F after cutting are set to the medium 52, the printer control unit 9 controls the printer 3 based on the printing data D1 received from the data processor 12 to print predetermined images F on the media 2D to 2F. When the printing processing performed by the printer 3 is ended, the three media 2D to 2F are completed.

In this modification, the data processor 12 transmits the cutting data D2 created by the data creating unit 11 to the printer control unit 9, and the printer control unit 9 controls the printer 3 based on the cutting data D2 received from the data processor 12 to print, on the medium 52 different from the medium 2, the alignment mark M2 for aligning the media 2D to 2F cut by the cutting device 4 in the printer 3.

That is, in this modification, even when the user does not create the alignment data for aligning the media 2D to 2F after cutting in the printer 3, the cutting data D2 is automatically transmitted from the data processor 12 to the printer control unit 9, and the alignment mark M2 is printed on the medium 52 by the printer 3 based on the cutting data D2. Thus, in this modification, the alignment mark M2 for aligning the media 2D to 2F after cutting in the printer 3 can be printed on the medium 52 without complicated work carried out by the user.

In this modification, the cutting data D2 with the designated special color is transmitted to the printer control unit 9, so that the printer control unit 9 can distinguish between the printing data D1 and the cutting data D2 by using the special color even when the cutting data D2 is transmitted to the printer control unit 9 together with the printing data D1. Thus, according to this modification, the printing data D1 and the cutting data D2 can be transmitted from the data processor 12 to the printer control unit 9 at the same time, and as a result, time required for transferring the data from the data processor 12 to the printer control unit 9 can be shortened.

As in the above embodiment, when the medium 2 after printing is cut by the cutting device 4 as a laser cutter, ink at end portions of the media 2A to 2C after cutting is melted, so that appearance of the media 2A to 2C after cutting is deteriorated when printing is performed up to the end portions of the media 2A to 2C after cutting. On the other hand, according to this modification, printing is performed on the media 2D to 2F after cutting, so that the appearance of the media 2D to 2F after cutting is good even when printing is performed up to the end portions of the media 2D to 2F after cutting.

Another Embodiment

In the above embodiment and the modification, the cutting device 4 may be a cutting device other than the laser cutter. For example, the cutting device 4 may be a cutting plotter. In the above embodiment and the modification, the printer 3 may be a printer other than the inkjet printer. In the above embodiment, the alignment data D3 may be created in a quadrangular frame shape other than a rectangle, or may be created in a frame shape other than a quadrangle. For example, the alignment data D3 may be created in a shape other than the frame shape such as a hook shape (L-shape). That is, the alignment mark M1 may be created in a quadrangular frame shape other than a rectangle, may be created in a frame shape other than a quadrangle, and may be created in a shape other than the frame shape such as a hook shape.

In the above embodiment, the processing device that performs predetermined processing on the medium 2 on which the printer 3 has performed printing may be a processing device other than the cutting device 4. For example, the processing device that performs predetermined processing on the medium 2 after printing may be a resin ejecting device (dispenser) that piles up resin (for example, resin containing a fluorescent paint) on the medium 2 after printing. In this case, the data creating unit 11 creates processing data for piling up resin on the medium 2 in place of the cutting data D2, and the data processor 12 receives the processing data and transmits the received processing data to the resin ejecting device.

The data processor 12 creates the alignment data D3 for aligning the medium 2 in the resin ejecting device based on the printing data D1 and the processing data, and transmits the alignment data D3 to the printer control unit 9. The printer control unit 9 controls the printer 3 based on the alignment data D3 to print the alignment mark on the medium 2. The printer control unit 9 controls the printer 3 based on the printing data D1 to print the image on the medium 2. When printing performed by the printer 3 is ended, the user carries the medium 2 after printing from the printer 3 to the resin ejecting device, and sets the medium 2 to the resin ejecting device using the alignment mark.

In the above modification, the processing device that performs predetermined processing on the medium 2 before printing is performed by the printer 3 may be a processing device other than the cutting device 4. For example, the processing device that performs predetermined processing on the medium 2 before printing may be a resin ejecting device that piles up resin on the medium 2 before printing. In this case, the data creating unit 11 creates processing data for piling up resin on the medium 2 in place of the cutting data D2, and the data processor 12 receives the processing data and transmits the received processing data to the resin ejecting device.

The data processor 12 transmits the printing data D1 and the processing data to the printer control unit 9. The printer control unit 9 controls the printer 3 based on the processing data received from the data processor 12 to print, on the medium 52, the alignment mark for aligning the medium 2 on which resin is piled up by the resin ejecting device in the printer 3. When printing of the alignment mark on the medium 52 is ended, the user carries the medium 2 on which resin is piled up to the printer 3, and sets the medium 2 to the medium 52 that is set on the table of the printer 3 by using the alignment mark.

In the above embodiment, special colors of the cutting data D2 and the alignment data D3 are designated, and the printing data D1, the cutting data D2, and the alignment data D3 are distinguished from each other based on the special color. That is, in the above embodiment, the printing data D1, the cutting data D2, and the alignment data D3 are managed based on the special color, but the printing data D1, the cutting data D2, and the alignment data D3 may be managed based on any factor other than the special color. For example, the printing data D1, the cutting data D2, and the alignment data D3 may be divided into layers, and the printing data D1, the cutting data D2, and the alignment data D3 may be managed based on the layers.

In this case, the data processor 12 transmits, to the printer control unit 9, the printing data D1, the cutting data D2, and the alignment data D3 individually as different pieces of data. That is, in this case, the data processor 12 transmits, to the printer control unit 9, the three pieces of data including the printing data D1, the cutting data D2, and the alignment data D3 individually. In this case, the special colors of the cutting data D2 and the alignment data D3 are not necessarily designated. In the above modification, the printing data D1 and the cutting data D2 may be managed based on the layers, for example.

What is claimed is:

1. A printing system comprising:
a processing device, configured to perform predetermined processing on a medium;
a printer, configured to perform printing on the medium that has been processed by the processing device;
a processing device control unit, configured to control the processing device;
a printer control unit, configured to control the printer;
a data creating unit, configured to create processing data for performing processing on the medium by the processing device and printing data for performing printing on the medium after being processed by the printer; and
a data processor, configured to receive the printing data and the processing data created by the data creating unit, transmit the received printing data and the processing data to the printer control unit, and transmit the received processing data to the processing device control unit, wherein
the printer control unit controls the printer based on the processing data received from the data processor to print, on a second medium different from the medium, an alignment mark for aligning the medium processed by the processing device in the printer.

2. The printing system according to claim 1, wherein
the processing device is a cutting device, configured to cut the medium in a predetermined shape,
the processing data is cutting data for cutting the medium in the predetermined shape, and
the printer control unit controls the printer based on the cutting data received from the data processor to print, on the second medium, the alignment mark for aligning the medium cut by the cutting device in the printer.

3. The printing system according to claim 2, wherein
the medium after cutting is manually set, by using the alignment mark, on the second medium that is set to the printer, and
the printer control unit controls the printer based on the printing data received from the data processor to perform printing on the medium after cutting.

4. The printing system according to claim 1, wherein
a special color of the processing data is designated by the data creating unit, and
the data processor transmits the processing data to the printer control unit together with the printing data.

5. The printing system according to claim 2, wherein
the medium is a flat-shaped resin plate made of resin, and
the cutting device is a laser cutter, configured to cut the medium with a laser beam.

6. A method of controlling a printing system, the printing system comprising:

a processing device, configured to perform predetermined processing on a medium;
a printer, configured to perform printing on the medium that has been processed by the processing device;
a printer control unit, configured to control the printer; and
a data creating unit, configured to create processing data for performing processing on the medium by the processing device and printing data for performing printing on the medium after being processed by the printer, the method of controlling the printing system comprising:
transmitting the printing data and the processing data created by the data creating unit to the printer control unit; and
controlling the printer based on the processing data by the printer control unit to print, on a second medium different from the medium, an alignment mark for aligning the medium processed by the processing device in the printer.

* * * * *